(12) United States Patent
Choi

(10) Patent No.: US 10,892,489 B2
(45) Date of Patent: Jan. 12, 2021

(54) COMPOSITE ANODE ACTIVE MATERIAL, AND ANODE AND LITHIUM BATTERY INCLUDING COMPOSITE ANODE ACTIVE MATERIAL

(71) Applicant: Samsung SDI Co., Ltd., Yongin-si, Gyeonggi-do (KR)

(72) Inventor: Youngjin Choi, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 179 days.

(21) Appl. No.: 15/684,867

(22) Filed: Aug. 23, 2017

(65) Prior Publication Data

US 2018/0062175 A1 Mar. 1, 2018

(30) Foreign Application Priority Data

Sep. 1, 2016 (KR) .......................... 10-2016-0112678

(51) Int. Cl.
| | |
|---|---|
| *H01M 4/60* | (2006.01) |
| *H01M 4/13* | (2010.01) |
| *H01M 4/1391* | (2010.01) |
| *H01M 4/1397* | (2010.01) |
| *H01M 4/1393* | (2010.01) |
| *H01M 10/052* | (2010.01) |
| *H01M 10/0525* | (2010.01) |

(52) U.S. Cl.
CPC .......... *H01M 4/602* (2013.01); *H01M 4/1391* (2013.01); *H01M 4/1393* (2013.01); *H01M 4/1397* (2013.01); *H01M 10/052* (2013.01); *H01M 10/0525* (2013.01)

(58) Field of Classification Search
CPC ............. H01M 4/60; H01M 4/13; H01M 2/02
See application file for complete search history.

(56) References Cited

U.S. PATENT DOCUMENTS

| | | | | |
|---|---|---|---|---|
| 4,707,422 A | * | 11/1987 | de Neufville | ......... H01M 4/242 429/101 |
| 6,033,804 A | * | 3/2000 | Doyle | ................. C08F 214/262 427/220 |
| 9,203,085 B2 | | 12/2015 | Jung et al. | |

(Continued)

FOREIGN PATENT DOCUMENTS

| | | |
|---|---|---|
| JP | 7-235328 A | 9/1995 |
| KR | 10-2007-0016431 A | 2/2007 |

(Continued)

OTHER PUBLICATIONS

Korean Office Action dated Sep. 11, 2020, issued in corresponding Korean Patent Application No. 10-2016-0112678 (6 pages).

*Primary Examiner* — Kenneth J Douyette
(74) *Attorney, Agent, or Firm* — Lewis Roca Rothgerber Christie LLP

(57) ABSTRACT

A composite anode active material includes a first core and a coating layer on the first core, in which the coating layer includes an ion-conductive polymer and the amount of the ion-conductive polymer is from about 0.0001 wt % to about 0.04 wt % based on a total weight of the composite anode active material. A lithium battery including the composite anode active material may have improved thickness expansion rate, and enhanced initial efficiency and lifespan characteristics.

11 Claims, 1 Drawing Sheet

(56) References Cited

U.S. PATENT DOCUMENTS 9,525,165 B2 12/2016 Kim et al.
2013/0209882 A1* 8/2013 Kim .................... C08K 5/5406
429/217

FOREIGN PATENT DOCUMENTS

| KR | 10-2012-0050037 A | 5/2012 |
|----|-------------------|--------|
| KR | 10-2012-0101970 A | 9/2012 |
| KR | 10-2013-0025825 A | 3/2013 |
| KR | 10-2014-0033934 A | 3/2014 |
| KR | 10-2014-0096581 A | 8/2014 |
| KR | 10-2015-0106253 A | 9/2015 |
| KR | 10-2015-0109241 A | 10/2015 |

* cited by examiner

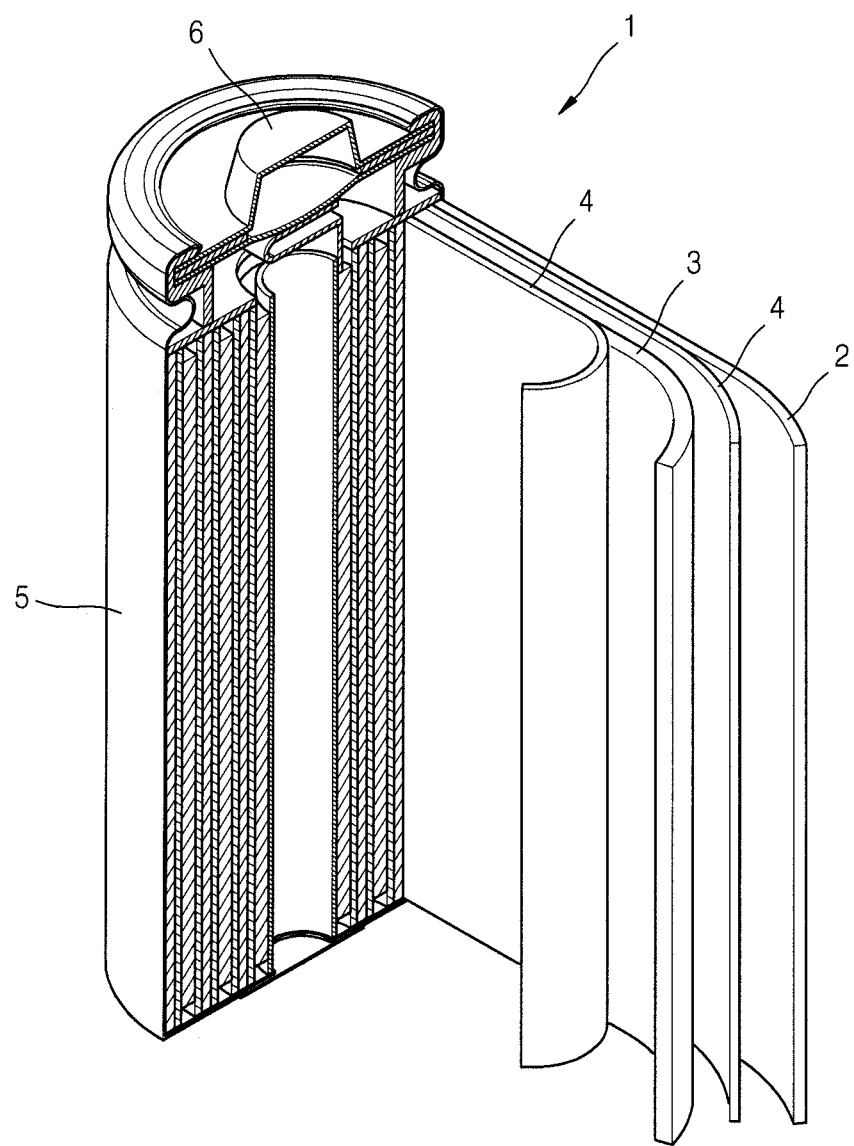

COMPOSITE ANODE ACTIVE MATERIAL, AND ANODE AND LITHIUM BATTERY INCLUDING COMPOSITE ANODE ACTIVE MATERIAL

CROSS-REFERENCE TO RELATED APPLICATION

This application claims priority to and the benefit of Korean Patent Application No. 10-2016-0112678, filed on Sep. 1, 2016, in the Korean Intellectual Property Office, the entire content of which is incorporated herein by reference.

BACKGROUND

1. Field

One or more aspects of embodiments of the present disclosure relate to composite anode active materials, and anodes and lithium batteries including the composite anode active materials.

2. Description of the Related Art

Lithium batteries have high voltage and high energy density and thus are used in various applications. For example, lithium batteries with excellent discharge capacity and lifespan characteristics are required for application in, for example, electric vehicles (e.g., hybrid electric vehicles (HEVs) and/or plug-in HEVs (PHEVs)) which can be operated at a high temperature, must be charged or discharged with a large amount of electricity, and are generally used for a long period of time.

Carbonaceous materials are porous and undergo small volumetric changes during charging and discharging, and thus they are stable for use as anode active materials. However, carbonaceous materials generally exhibit low battery capacity due to having a porous carbon structure. For example, when graphite, which is a highly crystalline material, is formed as $LiC_6$, it has a theoretical capacity of 372 mAh/g. In addition, this graphite has decreased high-rate characteristics.

Anode active materials having higher electric capacities than those of such carbonaceous materials may be metals alloyable with lithium. Non-limiting examples of the metals alloyable with lithium include silicon (Si), tin (Sn), and aluminum (Al). Such metals alloyable with lithium have high discharge capacities, but may easily deteriorate due to large volumetric changes thereof during charging and discharging, thus resulting in decreased lifespan characteristics.

To suppress the occurrence of side reactions due to the volumetric changes of metals alloyable with lithium, a method of introducing a carbonaceous coating layer, a coating layer with inorganic particles, and/or the like may be used. A method of introducing a carbonaceous coating layer on a core including a metal alloyable with lithium involves carbonization for formation of the carbonaceous coating layer, and the like, and thus preparation of an anode active material becomes more complicated. When a method of introducing a coating layer with inorganic particles on a core including a metal alloyable with lithium is used to fabricate a lithium battery, the lithium battery may have increased internal resistance due to an insulating property of inorganic particles and reduced initial efficiency.

Therefore, there is a need to develop a method of manufacturing a lithium battery having enhanced lifespan characteristics, whereby the volumetric change of a metal alloyable with lithium is suppressed (or reduced) through a relatively simple processes, without a decrease in initial efficiency.

SUMMARY

One or more aspects of one or more embodiments of the present disclosure are directed toward novel composite anode active materials.

One or more aspects of one or more embodiments of the present disclosure are directed toward anodes including the composite anode active materials.

One or more aspects of one or more embodiments of the present disclosure are directed toward lithium batteries including the anodes.

Additional aspects will be set forth in part in the description which follows and, in part, will be apparent from the description, or may be learned by practice of the presented embodiments.

According to one or more embodiments, a composite anode active material includes a first core including a metal alloyable with lithium, and a coating layer on the first core, wherein the coating layer includes an ion-conductive polymer, wherein an amount of the ion-conductive polymer is from about 0.0001 wt % to about 0.04 wt % based on a total weight of the composite anode active material.

According to one or more embodiments, an anode includes the composite anode active material described above.

According to one or more embodiments, a lithium battery includes the anode described above.

BRIEF DESCRIPTION OF THE DRAWING

These and/or other aspects will become apparent and more readily appreciated from the following description of the embodiments, taken in conjunction with the accompanying drawing in which:

The drawing is a view of a lithium battery according to an embodiment.

DETAILED DESCRIPTION

Reference will now be made in more detail to embodiments, examples of which are illustrated in the accompanying drawing, wherein like reference numerals refer to like elements throughout. In this regard, the present embodiments may have different forms and should not be construed as being limited to the descriptions set forth herein. Accordingly, the embodiments are merely described below, by referring to the drawing, to explain aspects of the present description. As used herein, the term "and/or" includes any and all combinations of one or more of the associated listed items. Expressions such as "at least one of," "one of," and "selected from," when preceding a list of elements, modify the entire list of elements and do not modify the individual elements of the list. Further, the use of "may" when describing embodiments of the present invention refers to "one or more embodiments of the present invention."

Hereinafter, anodes according to example embodiments of the present disclosure, and lithium batteries including the anodes, will be described in more detail.

A composite anode active material according to an embodiment includes: a first core including a metal alloyable with lithium; and a coating layer on the first core, in which the coating layer includes an ion-conductive polymer and the amount of the ion-conductive polymer is from about 0.0001 wt % to about 0.04 wt % based on a total weight of the composite anode active material. Since the ion-conductive polymer is included in the composite anode active material in an amount of about 0.0001 wt % to about 0.04 wt % based on the total weight of the composite anode active material, a side reaction between an electrolytic solution and the composite anode active material may be effectively prevented or reduced. Thus, a lithium battery including the composite anode active material may have an enhanced thickness expansion rate, as well as enhanced initial efficiency and lifespan characteristics. For example, the composite anode active material may include a coating layer including the ion-conductive polymer in an amount of about 0.0005 wt % to about 0.04 wt % based on the total weight of the composite anode active material. For example, the composite anode active material may include a coating layer including the ion-conductive polymer in an amount of about 0.001 wt % to about 0.04 wt % based on the total weight of the composite anode active material. For example, the composite anode active material may include a coating layer including the ion-conductive polymer in an amount of about 0.002 wt % to about 0.03 wt % based on the total weight of the composite anode active material. For example, the composite anode active material may include a coating layer including the ion-conductive polymer in an amount of about 0.003 wt % to about 0.03 wt % based on the total weight of the composite anode active material. For example, the composite anode active material may include a coating layer including the ion-conductive polymer in an amount of about 0.005 wt % to about 0.02 wt % based on the total weight of the composite anode active material. For example, the composite anode active material may include a coating layer including the ion-conductive polymer in an amount of about 0.007 wt % to about 0.015 wt % based on the total weight of the composite anode active material. When the amount of the ion-conductive polymer is lower than the ranges described above, the side reaction may be insufficiently suppressed. On the other hand, when the amount of the ion-conductive polymer is higher than the ranges described above, the coating layer may be excessively thick and thus diffusion of lithium ions would be difficult, resulting in an increase in internal resistance. In addition, as the amount of inert components increases, deterioration of initial efficiency and lifespan characteristics may result.

In the composite anode active material, the ion-conductive polymer may include at least one functional group selected from a carboxyl group, a carboxylate group, a cyano group, a phosphoric acid group, a sulfonic acid group, and a sulfonate group. In addition, the ion-conductive polymer may include an alkali metal, with which at least one functional group selected from a carboxyl group, a carboxylate group, a cyano group, a phosphoric acid group, a sulfonic acid, and a sulfonate group may be substituted. The alkali metal may be lithium. For example, hydrogen at a terminal of the carboxyl group may be substituted with lithium. For example, hydrogen at a terminal of a sulfonic acid group may be substituted with lithium.

The amount of the alkali metal included in the ion-conductive polymer may be from about 0.1 equivalents to about 1.0 equivalent with respect to the functional group (e.g., a carboxyl group and/or a sulfonic acid group). For example, the amount of the alkali metal included in the ion-conductive polymer may be from about 0.2 equivalents to about 0.9 equivalents with respect to a carboxyl group and/or an amide group. For example, the amount of the alkali metal included in the ion-conductive polymer may be from about 0.3 equivalents to about 0.8 equivalents with respect to a carboxyl group and/or a sulfonic acid group. For example, the amount of the alkali metal included in the ion-conductive polymer may be from about 0.4 equivalents to about 0.7 equivalents with respect to a carboxyl group and/or a sulfonic acid group. For example, the amount of the alkali metal included in the ion-conductive polymer may be from about 0.45 equivalents to about 0.55 equivalents with respect to a carboxyl group and/or a sulfonic acid group. When the amount of the alkali metal is within any of the ranges described above, further enhanced alkali metal ion conductivity may be obtained.

When the amount of lithium of the ion-conductive polymer (e.g., a degree of lithium ion substitution in the ion-conductive polymer) is less than 0.1 equivalents with respect to the functional group (e.g., a sulfonic acid group), a degree of prelithiation is low, and thus charging and discharging efficiencies may deteriorate in the first cycle. In addition, when the amount of lithium of the ion-conductive polymer, i.e., the degree of lithium ion substitution is greater than 1.0 equivalent with respect to the functional group (e.g., a sulfonic acid group), phase stability of a slurry may deteriorate. The amount of lithium (e.g., the degree of lithium ion substitution) within the ranges described above may be obtained by adding LION, used, for example, for the lithiation of Nafion®, in an amount of about 0.1 equivalents to about 1.0 equivalent with respect to a sulfonic acid group of Nafion®.

For example, in the composite anode active material, the ion-conductive polymer may include a lithium-substituted salt of at least one selected from poly(perfluorosulfonic acid), poly(perfluorocarboxylic acid), polystyrenesulfonic acid, polystyrenecarboxylic acid, sulfonated polyethersulfone, sulfonated polyetherketone, sulfonated polyetheretherketone, sulfonated polyarylethersulfone, sulfonated polysulfone, sulfonated polyimide, sulfonated polyphosphazene, sulfonated polybenzimidazole, sulfonated polyaryleneethersulfone, sulfonated polyphenylsulfide, sulfonated polyvinyl alcohol, and a sulfonic acid group-containing tetrafluoroethylene-fluorovinylether copolymer. In an embodiment, the above-listed polymers may include forms substituted with lithium salts.

In the composite anode active material of the present embodiments, the ion-conductive polymer may be a tetrafluoroethylene-fluorovinylether copolymer represented by Formula 1 below:

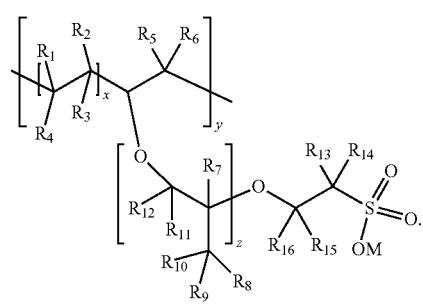

Formula 1

In Formula 1, each of $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{16}$ may independently be selected from hydrogen, a halogen, a halogen-substituted or unsubstituted $C_1$-$C_{10}$ alkyl group, a halogen-substituted or unsubstituted $C_2$-$C_{10}$ alkenyl group, a halogen-substituted or unsubstituted $C_2$-$C_{10}$ alkynyl group, a halogen-substituted or unsubstituted $C_5$-$C_{10}$ cycloalkyl group, a halogen-substituted or unsubstituted $C_6$-$C_{20}$ aryl group, and a halogen-substituted or unsubstituted $C_2$-$C_{20}$ heteroaryl group; M may be hydrogen (H), lithium (Li), sodium (Na), or potassium (K); and at least one of $R_1$, $R_2$, $R_3$, $R_4$, $R_5$, $R_6$, $R_7$, $R_8$, $R_9$, $R_{10}$, $R_{11}$, $R_{12}$, $R_{13}$, $R_{14}$, $R_{15}$, and $R_{16}$ may include fluorine; the sum of x, y and z may equal to 1 (x+y+z=1, where 0<x<1, 0<y<1, and 0<z<1); and x, y, and z may be molar fractions of the respective repeating units.

For example, in the composite anode active material, the ion-conductive polymer may be a tetrafluoroethylene-fluorovinylether copolymer represented by Formula 2 below:

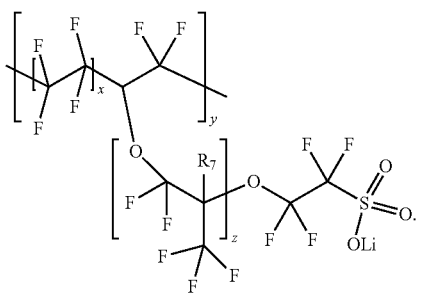

Formula 2

In Formula 2, the sum of x, y and z may equal to 1 (x+y+z=1, where 0<x<1, 0<y<1, 0<z<1), and x, y, and z may be molar fractions of respective repeating units.

In the composite anode active material, the ion-conductive polymer may have a weight average molecular weight of about 10,000 Daltons to 1,000,000 Daltons. For example, the weight average molecular weight of the ion-conductive polymer may be from about 30,000 Daltons to about 1,000,000 Daltons. For example, the weight average molecular weight of the ion-conductive polymer may be from about 50,000 Daltons to about 1,000,000 Daltons. For example, the weight average molecular weight of the ion-conductive polymer may be from about 70,000 Daltons to about 1,000,000 Daltons. For example, the weight average molecular weight of the ion-conductive polymer may be from about 100,000 Daltons to about 1,000,000 Daltons. When the weight average molecular weight of the ion-conductive polymer is within any of the ranges described above, a lithium battery with further enhanced charge/discharge characteristics may be obtained.

The composite anode active material may further include, in addition to the first core, a second core including a carbonaceous material. Here, a coating layer including the ion-conductive polymer may also be disposed (e.g., positioned) on the second core. Thus, a composite anode active material according to an embodiment may include first and second cores and a coating layer disposed on each of the first and second cores, where each coating layer includes the ion-conductive polymer, and the amount of the ion-conductive polymer may be from about 0.0001 wt % to about 0.04 wt % based on a total weight of the composite anode active material.

In the composite anode active material, the amount of the first core may be about 30 wt % or less based on a total weight of the first and second cores. For example, in the composite anode active material, the amounts of the first core and the second core may be from about 1 wt % to about 30 wt % and from about 70 wt % to about 99 wt %, respectively. For example, in the composite anode active material, the amounts of the first core and the second core may be from about 5 wt % to about 25 wt % and from about 75 wt % to about 95 wt %, respectively. For example, in the composite anode active material, the amounts of the first core and the second core may be from about 8 wt % to about 20 wt % and from about 80 wt % to about 92 wt %, respectively. For example, in the composite anode active material, the amounts of the first core and the second core may be from about 10 wt % to about 15 wt % and from about 85 wt % to about 90 wt %, respectively. When the amounts of the first and second cores are within any of the above ranges, a lithium battery with further enhanced charge/discharge characteristics may be obtained.

In the composite anode active material, the first core may include at least one metal selected from silicon (Si), tin (Sn), aluminum (Al), germanium (Ge), lead (Pb), zinc (Zn), silver (Ag), and gold (Au); an alloy, oxide, nitride, oxynitride, and/or carbide thereof; or the first core may include a composite of one of these materials and a carbonaceous material. For example, the first core may be a silicon-based alloy represented by the formula Si—Fe or Si—Fe-$M_1$, wherein $M_1$ includes at least one selected from lithium (Li), magnesium (Mg), calcium (Ca), titanium (Ti), vanadium (V), chrome (Cr), manganese (Mn), cobalt (Co), nickel (Ni), copper (Cu), zinc (Zn), yttrium (Y), zirconium (Zr), molybdenum (Mo), indium (In), tin (Sn), boron (B), carbon (C), oxygen (O), and phosphorus (P).

For example, the Si—Fe alloy may be represented by Formula 3 below:

$Si_xFe_y$. <span>Formula 3</span>

In Formula 3, x and y may refer to atomic percentages, x+y=100, x≥55, and y<22. For example, in Formula 3, x≥60 and y<20.

For example, the Si—Fe-$M_1$ alloy may be represented by Formula 4 below:

$Si_xFe_yM_{1z}$. <span>Formula 4</span>

In Formula 4, x, y, and z may refer to atomic percentages, x+y+z=100, 67≤x≤92, 45≤y≤32, 0.3≤z≤6, and $M_1$ may be at least one selected from Li, Mg, Ca, Ti, V, Cr, Mn, Co, Ni, Cu, Zn, Y, Zr, Mo, In, Sn, B, C, O, and P. For example, in Formula 4, 75≤x≤90, 9≤y≤27, and 0.3≤z≤6.

In an embodiment, the silicon-based alloy of Formula 2 includes a Si single phase, an α-$FeSi_2$ phase, and a β-$FeSi_2$ phase, and registers a diffraction peak (a first peak) due to the α-$FeSi_2$ phase at a Bragg angle 2θ of about 17.0+/−0.5° and a diffraction peak (a second peak) due to the β-$FeSi_2$ phase at a Bragg angle 2θ of about 28.7+/−0.5°, in which a ratio of a diffraction intensity of the diffraction peak due to the β-$FeSi_2$ phase (a second peak) to a diffraction intensity of the diffraction peak due to the α-$FeSi_2$ phase (a first peak) is about 0.1 or greater.

In the composite anode active material, the second core may include natural graphite, artificial graphite, expandable graphite, graphene, carbon black, fullerene soot, carbon nanotubes, carbon fiber, soft carbon, hard carbon, pitch carbide, mesophase pitch carbide, sintered cokes, and/or the like, and at least two of these materials may be used in combination in the second core.

In the composite anode active material, the coating layers may be obtained by mixing, filtering, and drying 100 parts by weight of a polymer solution including the ion-conductive polymer in an amount of about 0.01 wt % to about 0.5 wt % based on a total weight (i.e., 10 parts by weight) of the first and second cores. For example, the coating layers may be obtained by mixing, filtering, and drying 100 parts by weight of a polymer solution including the ion-conductive polymer in an amount of 0.05 wt % to about 0.45 wt % based on a total weight (i.e., 10 parts by weight) of the first and second cores. The coating layers may be obtained by mixing, filtering, and drying 100 parts by weight of a polymer solution including the ion-conductive polymer in an amount of about 0.1 wt % to about 0.4 wt % based on a total weight (i.e., 10 parts by weight) of the first and second cores. The coating layers may be obtained by mixing, filtering, and drying 100 parts by weight of a polymer solution including the ion-conductive polymer in an amount of about 0.2 wt % to about 0.4 wt % based on a total weight (i.e., 10 parts by weight) of the first and second cores. The coating layers may be obtained by mixing, filtering, and drying 100 parts by weight of a polymer solution including the ion-conductive polymer in an amount of about 0.25 wt % to about 0.35 wt % based on a total weight (i.e., 10 parts by weight) of the first and second cores. A lithium battery including the composite anode active material including the coating layers obtained using the polymer solution within any of the above-described amount ranges may have enhanced charge/discharge characteristics.

For example, the composite anode active material may include a Si—Fe alloy as the first core and graphite as the second core, and coating layers obtained by mixing, filtering, and drying 100 parts by weight of a polymer solution including Nafion® in an amount of about 0.1 wt % to about 0.4 wt % based on a total weight (i.e., 10 parts by weight) of the first and second cores.

A lithium battery including the composite anode active material including the coating layer including the ion-conductive polymer may have initial charge/discharge efficiency represented by Equation 1 below that is higher than that of a lithium battery including an anode active material including only a core and not including a coating layer.

Initial charge/discharge efficiency(%)=[discharge capacity at $1^{st}$ cycle/charge capacity at $1^{st}$ cycle]×100.  Equation 1

By way of a comparative example, a composite anode active material including an inorganic-based coating layer may have increased internal resistance due to an insulating property of the inorganic-based coating layer, and thus a lithium battery including such composite anode active material including the inorganic-based coating layer may have decreased initial charge/discharge efficiency. In contrast, the composite anode active material of the present embodiments has relatively decreased internal resistance, even after coating the core thereof with the ion-conductive polymer, and thus a lithium battery including the composite anode active material coated with the ion-conductive polymer may have increased initial charge and discharge efficiency. In addition, as described above, ionic conductivity may be further enhanced by substitution of the ion-conductive polymer with lithium.

A lithium battery including the composite anode active material having the coating layer including the ion-conductive polymer may have a capacity retention rate (represented by Equation 2 below) of about 103% or more of that of a lithium battery in which an anode active material includes only a core and not a coating layer. For example, the lithium battery including the composite anode active material may have a capacity retention rate (represented by Equation 2 below) of about 104% or more of that of the lithium battery in which an anode active material includes only a core and not a coating layer. For example, the lithium battery including the composite anode active material may have a capacity retention rate (represented by Equation 2 below) of about 105% or more of that of the lithium battery in which an anode active material includes only a core and not a coating layer. According to embodiments of the present disclosure, by coating the core with the ion-conductive polymer, a side reaction between the core and an electrolytic solution may be suppressed (or reduced) and, accordingly, the lithium battery may have enhanced lifespan characteristics. The coating layer including an ion-conductive polymer may act as a solid electrolyte interface (SEI) film which transfers lithium ions and blocks (or substantially blocks) a solvent, and thus a side reaction between the core and an electrolyte may be prevented or reduced.

Capacity retention rate(%)=[discharge capacity at $50^{th}$ cycle/discharge capacity at $1^{st}$ cycle]×100.  Equation 2

An anode including the composite anode active material having the coating layer including an ion-conductive polymer may have a thickness expansion rate represented by Equation 3 below of about 95% or less of that of an anode in which an anode active material includes only a core and not a coating layer. For example, the thickness expansion rate represented by Equation 3 of the anode including the composite anode active material having the coating layer including an ion-conductive polymer may be about 90% or less of that of the anode in which an anode active material includes only a core and not a coating layer. For example, the thickness expansion rate of Equation 3 of the anode including the composite anode active material having the coating layer including an ion-conductive polymer may be about 85% or less of that of the anode in which an anode active material includes only a core and not a coating layer. In the composite anode active material, the coating layer including an ion-conductive polymer is disposed (e.g., positioned) on the core, and thus occurrence of volumetric change of the core including a metal alloyable with lithium may be prevented or reduced during the charging and discharging of the lithium battery and, accordingly, volumetric change of the anode including the composite anode active material may be suppressed or reduced. Due to the suppression of volumetric change of the anode, the volumetric change of the lithium battery may be suppressed or reduced during the charging and discharging, and thus deterioration of the lithium battery, that may otherwise occur due to the volumetric change, may be suppressed or reduced, thus resulting in enhanced lifespan characteristics of the lithium battery.

Thickness expansion rate(%)=[thickness of anode after $100^{th}$ cycles of charging and discharging/thickness of anode before $1^{st}$ cycle of charging]×100  Equation 3

According to an embodiment, an anode may include the composite anode active material of the present embodiments. The anode may be manufactured using the following method.

The anode may be fabricated by molding, into a certain shape, an anode active material composition including the composite anode active material described above, a conductive material, and a binder, or by coating a current collector such as copper foil and/or the like with the anode active material composition.

For example, an anode active material composition, in which the composite anode active material, a conductive material, a binder, and a solvent are mixed, may be prepared. The anode active material composition may be then directly coated on a metal current collector to manufacture an anode plate. In another embodiment, the anode active material composition may be cast on a separate support and then a film separated from the support may be laminated on a metal current collector, to thereby complete the manufacture of an anode plate. A fabrication method of the anode is not limited to the above examples and the anode may be manufactured using any other suitable method.

Non-limiting examples of the conductive material include acetylene black, Ketjen black, natural graphite, artificial graphite, carbon black, carbon fibers, and metallic powder and/or fibers of copper, nickel, aluminum, and/or silver. In addition, a conductive material selected from polyphenylene derivatives and the like may be used alone or one or more thereof may be used in combination. However, the conductive material is not limited to the above examples and any suitable conductive material may be used. In some embodiments, the crystalline carbonaceous material described above may be added as a conductive material.

Examples of the binder include carboxymethylcellulose (CMC), styrene-butadiene rubber (SBR), a vinylidene fluoride/hexafluoropropylene copolymer, polyvinylidene fluoride (PVDF), polyacrylonitrile, polymethyl methacrylate, polytetrafluoroethylene, a mixture of the aforementioned polymers, and a styrene-butadiene rubber-based polymer. However, the binder is not particularly limited to the above examples and may be any suitable binder used in the art.

The solvent may be N-methylpyrrolidone, acetone, water, and/or the like. However, the solvent is not particularly limited to the above examples and may be any suitable solvent used in the art.

The amount of each of the composite anode active material, the conductive material, the binder, and the solvent may be any amount suitable for use in a lithium battery. At least one of the conductive material, the binder, and the solvent may not be used, depending on the desired use and constitution of the lithium battery being manufactured.

According to another embodiment, a lithium battery includes the anode including the composite anode active material of the present embodiments. The lithium battery may be manufactured using the following method.

First, an anode is prepared according to the fabrication method of an anode described above.

Next, a cathode active material composition, in which a cathode active material, a conductive material, a binder, and a solvent are mixed, is prepared. The cathode active material composition may be then directly coated on a metal current collector and dried to manufacture a cathode plate. In another embodiment, the cathode active material composition may be cast on a separate support and then a film separated from the support may be laminated on a metal current collector, to thereby complete the manufacture of a cathode plate.

The cathode active material may include at least one selected from lithium cobalt oxide, lithium nickel cobalt manganese oxide, lithium nickel cobalt aluminum oxide, lithium iron phosphate, and lithium manganese oxide. However, the cathode active material is not limited to the above examples and any suitable cathode active material may be used.

In some embodiments, the cathode active material may be a compound represented by one of the following formulae: $Li_aA_{1-b}B'_bD'_2$ (where $0.90 \leq a \leq 1.8$, and $0 \leq b \leq 0.5$); $Li_aE_{1-b}B'_bO_{2-c}D'_c$ (where $0.90 \leq a \leq 1.8$, $0 \leq b \leq 0.5$, $0 \leq c \leq 0.05$); $LiE_{2-b}B'_bO_{4-c}D'_c$ (where $0 \leq b \leq 0.5$, $0 \leq c \leq 0.05$); $Li_aNi_{1-b-c}Co_bB'_cD'_\alpha$ (where $0.90 \leq a \leq 1.8$, $0 \leq b \leq 0.5$, $0 \leq c \leq 0.05$, and $0 < \alpha \leq 2$); $Li_aNi_{1-b-c}Co_bB_cO_{2-\alpha}F'_\alpha$ (where $0.90 \leq a \leq 1.8$, $0 \leq b \leq 0.5$, $0 \leq c \leq 0.05$, and $0 < a < 2$); $Li_aNi_{1-b-c}Co_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cF'_\alpha$ (where $0.90 \leq a \leq 1.8$, $0 \leq b \leq 0.5$, $0 \leq c \leq 0.05$, and $0 < a \leq 2$); $Li_aNi_{1-b-c}Mn_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_{1-b-c}Mn_bB'_cO_{2-\alpha}F'_2$ (where $0.90 \leq a \leq 1.8$, $0 \leq b \leq 0.5$, $0 \leq c \leq 0.05$, and $0 < \alpha < 2$); $Li_aNi_bE_cG_dO_2$ (where $0.90 \leq a \leq 1.8$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1.8$, $0 \leq b \leq 0.9$, $0 \leq c \leq 0.5$, $0 \leq d \leq 0.5$, and $0.001 \leq e \leq 0.1$.); $Li_aNiG_bO_2$ (where $0.90 \leq a \leq 1.8$, and $0.001 \leq b \leq 0.1$.); $Li_aCoG_bO_2$ (where $0.90 \leq a \leq 1.8$, and $0.001 \leq b \leq 0.1$.); $Li_aMnG_bO_2$ (where $0.90 \leq a \leq 1.8$, and $0.001 \leq b \leq 0.1$.); $Li_aMn_2G_bO_4$ (where $0.90 \leq a \leq 1.8$, and $0.001 \leq b \leq 0.1$.); $QO_2$; $QS_2$; $LiQS_2$; $V_2O_5$; $LiV_2O_5$; $LiIO_2$; $LiNiVO_4$; $Li_{3-f}J_2(PO_4)_3 (0 \leq f \leq 2)$; $Li_{(3-f)}Fe_2(PO_4)_3 (0 \leq f \leq 2)$; and $LiFePO_4$.

In the formulae above, A may be selected from nickel (Ni), cobalt (Co), manganese (Mn), and combinations thereof; B' may be selected from aluminum (Al), nickel (Ni), cobalt (Co), manganese (Mn), chromium (Cr), iron (Fe), magnesium (Mg), strontium (Sr), vanadium (V), a rare earth element, and combinations thereof; 6 may be selected from oxygen (O), fluorine (F), sulfur (S), phosphorus (P), and combinations thereof; E may be selected from cobalt (Co), manganese (Mn), and combinations thereof; F may be selected from fluorine (F), sulfur (S), phosphorus (P), and combinations thereof; G may be selected from aluminum (Al), chromium (Cr), manganese (Mn), iron (Fe), magnesium (Mg), lanthanum (La), cerium (Ce), strontium (Sr), vanadium (V), and combinations thereof; Q may be selected from titanium (Ti), molybdenum (Mo), manganese (Mn), and combinations thereof; I' may be selected from chromium (Cr), vanadium (V), iron (Fe), scandium (Sc), yttrium (Y), and combinations thereof; and J may be selected from vanadium (V), chromium (Cr), manganese (Mn), cobalt (Co), nickel (Ni), copper (Cu), and combinations thereof.

The compounds listed above as cathode active materials may have a surface coating layer. Alternatively, a mixture of a compound without a surface coating layer and a compound having a surface coating layer, the compounds being selected from the compounds listed above, may be used. In some embodiments, the surface coating layer may include at least one compound of a coating element selected from an oxide, a hydroxide, an oxyhydroxide, an oxycarbonate, and a hydroxycarbonate of the coating element. In some embodiments, the compounds for the surface coating layer may be amorphous or crystalline. In some embodiments, the coating element for the surface coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. In some embodiments, the surface coating layer may be formed using any suitable method that does not adversely affect the physical properties of the cathode active material when a compound of the coating element is used. For example, the surface coating layer may be formed using a spray coating method and/or a dipping method. The coating methods may be well understood by those of ordinary skill in the art, and thus a detailed description thereof will not be provided.

For example, the cathode active material may be $LiNiO_2$, $LiCoO_2$, $LiMn_xO_{2x}$ where $x=1$ or 2, $LiNi_{1-x}Mn_xO_2$ where $0<x<1$, $LiNi_{1-x-y}Co_xMn_yO_2$ where $0 \leq x \leq 0.5$ and $0 \leq y \leq 0.5$, $LiFeO_2$, $V_2O_5$, TiS, MoS, and/or the like.

In the cathode active material composition, the conductive material, the binder, and the solvent may be the same as those used in the anode active material composition. In one embodiment, pores may be formed in an electrode plate by further adding a plasticizer to the cathode active material composition and/or the anode active material composition.

The amount of each of the cathode active material, the conductive material, the binder, and the solvent may be any amount suitable for use in a lithium battery. At least one of the conductive material, the binder, and the solvent may not be used, depending on the desired use and constitution of the lithium battery to be manufactured.

Next, a separator may be be disposed between the cathode and the anode. The separator for the lithium battery may be any suitable separator used in lithium batteries. In some embodiments, the separator may have low resistance to migration of ions in an electrolyte and an excellent electrolyte-retaining ability. Non-limiting examples of the separator include glass fiber, polyester, Teflon™, polyethylene, polypropylene, polytetrafluoroethylene (PTFE), and a combination thereof, each of which may be a non-woven or a woven fabric. For example, a rollable separator including polyethylene and/or polypropylene may be used for a lithium ion battery. A separator with a good organic electrolytic solution-retaining ability may be used for a lithium ion polymer battery. For example, the separator may be manufactured in the following manner.

In some embodiments, a polymer resin, a filler, and a solvent may be mixed together to prepare a separator composition. Then, the separator composition may be directly coated on an electrode, and then dried to form the separator. In some embodiments, the separator composition may be cast on a support and then dried to form a separator film, which may then be separated from the support and laminated on an electrode to form the separator.

The polymer resin used to manufacture the separator may be any material suitable for use as a binder for electrode plates. Non-limiting examples of the polymer resin include a vinylidenefluoride/hexafluoropropylene copolymer, polyvinylidene fluoride (PVDF), polyacrylonitrile, polymethylmethacrylate, and mixtures thereof.

Then, an electrolyte may be prepared.

In some embodiments, the electrolyte may be an organic electrolyte solution. In some embodiments, the electrolyte may be in a solid phase. Non-limiting examples of the electrolyte include lithium oxide and lithium oxynitride. Any material suitable for use as a solid electrolyte may be utilized. In some embodiments, the solid electrolyte may be formed on the anode by, for example, sputtering.

In some embodiments, the organic electrolyte solution may be prepared by dissolving a lithium salt in an organic solvent.

The organic solvent may be any suitable organic solvent. In some embodiments, the organic solvent may be propylene carbonate, ethylene carbonate, fluoroethylene carbonate, butylene carbonate, dimethyl carbonate, diethyl carbonate, methylethyl carbonate, methylpropyl carbonate, ethylpropyl carbonate, methylisopropyl carbonate, dipropyl carbonate, dibutyl carbonate, benzonitrile, acetonitrile, tetrahydrofuran, 2-methyltetrahydrofuran, γ-butyrolactone, dioxorane, 4-methyldioxorane, N,N-dimethyl formamide, dimethyl acetamide, dimethylsulfoxide, dioxane, 1,2-dimethoxyethane, sulfolane, dichloroethane, chlorobenzene, nitrobenzene, diethylene glycol, dimethyl ether, or a mixture thereof.

In some embodiments, the lithium salt may be any material suitable for use as a lithium salt. In some embodiments, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1} SO_2)(C_yF_{2y+1} SO_2)$ (wherein x and y are each independently a natural number, for example, an integer), LiCl, LiI, or a mixture thereof.

Referring to the drawing, a lithium battery 1 includes a cathode 3, an anode 2, and a separator 4. In some embodiments, the cathode 3, the anode 2, and the separator 4 may be wound or folded, and then sealed in a battery case 5. In some embodiments, the battery case 5 may be filled with an organic electrolytic solution and then sealed with a cap assembly 6, to thereby complete the manufacture of the lithium battery 1. In some embodiments, the battery case 5 may be a cylindrical case, a rectangular case, or a thin-film case. For example, the lithium battery 1 may be a thin-film type (or kind) battery. In some embodiments, the lithium battery 1 may be a lithium ion battery.

In some embodiments, the separator may be disposed between the cathode and the anode to form a battery assembly. In some embodiments, the battery assembly may be stacked in a bi-cell structure and impregnated with the electrolytic solution. In some embodiments, the resultant assembly may be placed into a pouch and hermetically sealed, to thereby complete the manufacture of a lithium ion polymer battery.

In some embodiments, a plurality of battery assemblies may be stacked to form a battery pack, which may be used in any device that requires high capacity and high output, for example, in a laptop computer, a smartphone, and/or an electric vehicle.

For example, the lithium battery according to embodiments of the present disclosure may have excellent high-rate characteristics and lifespan characteristics, and thus may be suitable for use in electric vehicles (EVs). For example, the lithium battery may be suitable for use in hybrid vehicles such as plug-in hybrid electric vehicles (PHEVs) and/or the like.

In the present specification, a substituent may refer to a substitution of at least one hydrogen atom in an unsubstituted mother (parent) group with another atom or a functional group. Unless stated otherwise, the term "substituted" as used herein may refer to a functional group being substituted with at least one substituent selected from a $C_1$-$C_{40}$ alkyl group, a $C_2$-$C_{40}$ alkenyl group, a $C_2$-$C_{40}$ alkynyl group, a $C_3$-$C_{40}$ cycloalkyl group, a $C_3$-$C_{40}$ cycloalkenyl group, and a $C_7$-$C_{40}$ aryl group. The phrase "optionally substituted" as used herein may refer to any of the functional groups described above being optionally substituted with any of the aforementioned substituents.

As used herein, a and b in the expression "$C_a$-$C_b$" may refer to the number of carbon atoms in the $C_a$-$C_b$ functional group. That is, the $C_a$-$C_b$ functional group may include a to b carbon atoms. For example, the expression "$C_1$-$C_4$ alkyl group" may refer to an alkyl group having 1 to 4 carbon atoms, for example, $CH_3$—, $CH_3CH_2$—, $CH_3CH_2CH_2$—, $(CH_3)_2CH$—, $CH_3CH_2CH_2CH_2$—, $CH_3CH_2CH(CH_3)$—, and/or $(CH_3)_3C$—.

A substituent may be a monovalent or a divalent group, depending on the context. For example, when a substituent needs two binding sites for binding with the rest of the molecule, the substituent may be a divalent group. For example, an alkyl group that needs two binding sites may be a divalent alkylene group, such as —$CH_2$—, —$CH_2CH_2$—, —$CH_2CH(CH_3)CH_2$—, and/or the like. The term "alkylene" as used herein my refer to a divalent alkyl group.

The terms "alkyl group" and "alkylene group" as used herein may refer to a branched or unbranched aliphatic hydrocarbon group. In an embodiment, the alkyl group may be substituted or unsubstituted. Non-limiting examples of the alkyl group include a methyl group, an ethyl group, a propyl group, an isopropyl group, a butyl group, an isobutyl group, a tert-butyl group, a pentyl group, a hexyl group, a cyclopropyl group, a cyclopentyl group, a cyclohexyl group, and a cycloheptyl group, each of which may be optionally substituted or unsubstituted. In an embodiment, the alkyl group may have 1 to 6 carbon atoms. For example, a $C_1$-$C_6$ alkyl group may be methyl, ethyl, propyl, isopropyl, butyl, iso-butyl, sec-butyl, pentyl, 3-pentyl, hexyl, and/or the like, but is not limited to the above examples.

The term "alkenyl group" as used herein may refer to a hydrocarbon group having 2 to 20 carbon atoms with at least one carbon-carbon double bond at one or more positions along the hydrocarbon chain of the group. Non-limiting examples of the alkenyl group include an ethenyl group, a 1-propenyl group, a 2-propenyl group, a 2-methyl-1-propenyl group, a 1-butenyl group, a 2-butenyl group, a cyclopropenyl group, a cyclopentenyl group, a cyclohexcenyl group, and a cycloheptenyl group. In an embodiment, these alkenyl groups may be substituted or unsubstituted. In an embodiment, the alkenyl group may have 2 to 40 carbon atoms.

The term "alkynyl group" as used herein may refer to a hydrocarbon group having 2 to 20 carbon atoms with at least one carbon-carbon triple bond at one or more positions along the hydrocarbon chain of the group. Non-limiting examples of the alkynyl group include an ethynyl group, a 1-propynyl group, a 1-butynyl group, and a 2-butynyl group. In an embodiment, these alkynyl groups may be substituted or unsubstituted. In an embodiment, the alkynyl group may have 2 to 40 carbon atoms.

The term "cycloalkyl group" as used herein may refer to a fully saturated carbocyclic ring or ring system. For example, the cycloalkyl group may be a cyclopropyl group, a cyclobutyl group, a cyclopentyl group, and/or a cyclohexyl group.

The term "aromatic" as used herein may refer to a ring or ring system with a conjugated π electron system, and may refer to a carbocyclic aromatic group (e.g., a phenyl group) and/or a heterocyclic aromatic group (e.g., pyridine). In this regard, an aromatic ring system as a whole may include a monocyclic ring or a fused polycyclic ring (i.e., a system of two or more rings that share adjacent atom pairs).

The term "aryl group" as used herein may refer to an aromatic ring or ring system (i.e., a ring fused from at least two rings that share two adjacent carbon atoms) having only carbon atoms in its backbone, or a ring in which a plurality of aromatic rings are linked to each other by a single bond, —O—, —S—, —C(=O)—, —S(=O)$_2$—, or —Si($R_a$)($R_b$)— where each of $R_a$ and $R_b$ is independently a $C_1$-$C_{10}$ alkyl group, a halogen-substituted or unsubstituted $C_1$-$C_{10}$ alkylene group, or —C(=O)—NH—. When the aryl group is a ring system, each ring in the ring system is aromatic. Non-limiting examples of the aryl group include a phenyl group, a biphenyl group, a naphthyl group, a phenanthrenyl group, and a naphthacenyl group. These aryl groups may be substituted or unsubstituted.

The term "arylene group" as used herein refers to an aryl group requiring at least two binding sites. A tetravalent arylene group is an aryl group requiring four binding sites, and a divalent arylene group is an aryl group requiring two binding sites. For example. For example, the arylene group may be —$C_6H_5$—O—$C_6H_5$—, and the like.

The term "heteroaryl group" as used herein refers to an aromatic ring system with one ring, or a plurality of fused rings or a plurality of rings linked to each other by a single bond, —O—, —S—, —C(=O)—, —S(=O)$_2$—, or —Si($R_a$)($R_b$)— where each of $R_a$ and $R_b$ is independently a $C_1$-$C_{10}$ alkyl group, a halogen-substituted or unsubstituted alkylene group, or —C(=O)—NH—, in which at least one ring atom is not carbon, i.e., a heteroatom. In the fused ring system, at least one heteroatom may be present in only one ring. For example, the heteroatom may be oxygen, sulfur, or nitrogen, but is not limited to the above examples. Non-limiting examples of the heteroaryl group include a furanyl group, a thienyl group, an imidazolyl group, a quinazolinyl group, a quinolinyl group, an isoquinolinyl group, a quinoxalinyl group, a pyridinyl group, a pyrrolyl group, an oxazolyl group, and an indolyl group.

The term "heteroarylene group" as used herein refers to a heteroaryl group requiring at least two binding sties. A tetravalent heteroarylene group is a heteroaryl group requiring four binding sites, and a divalent heteroarylene group is a heteroaryl group requiring two binding sites.

The terms "aralkyl group" and "alkylaryl group" as used herein refer to an aryl group linked as a substituent via an alkylene group, such as a $C_7$-$C_{14}$ aralkyl group. Non-limiting examples of the aralkyl group or alkylaryl group include a benzyl group, a 2-phenylethyl group, a 3-phenylpropyl group, and a naphthylalkyl group. In an embodiment, the alkylene group may be a lower alkylene group (i.e., a $C_1$-$C_4$ alkylene group).

The term "cycloalkenyl group" as used herein refers to a non-aromatic carbocyclic ring or ring system with at least one double bond. For example, the cycloalkenyl group may be a cyclohexenyl group.

The term "heterocyclic group" as used herein refers to a non-aromatic ring or ring system having at least one heteroatom in its ring backbone.

The term "halogen" as used herein refers to a stable element belonging to Group 17 of the periodic table, for example, fluorine, chlorine, bromine, or iodine. For example, the halogen may be fluorine and/or chlorine.

Weight average molecular weights of the first, second, and third polymers are measured by gel permeation chromatography (GPC) using a polystyrene standard sample.

One or more embodiments of the present disclosure will now be described in further detail with reference to examples and comparative examples. However, these examples are provided only for illustrative purposes and are not intended to limit the scope of the present disclosure.

(Preparation of Composite Anode Active Material)

Example 1

100 parts by weight (0.3 wt %) of a lithium-substituted Nafion® solution was added to 10 parts by weight of a mixture of a silicon-iron (Si—Fe) alloy (average particle diameter: about 3 μm, 3M, CV6, 3×66) and graphite (available from Shanshan, 3HE) in a weight ratio of 13:87, and the resulting solution was stirred for 1 hour and filtered, followed by drying in an oven at 110° C., thereby completing the preparation of a composite anode active material having coating layers on surfaces of the Si—Fe alloy and the graphite. The amount of Nafion® coated was 0.01 wt % of a total weight of the composite anode active material.

The 0.3 wt % lithium-substituted Nafion® solution was prepared by adding 0.1 M LiOH to 5 wt % Nafion® solution (Alfa Aesar, 42118, 100,000 to 1,000,000 Daltons) for the adjustment of pH to 6.0, stirring the resulting solution for 3 hours, and adding deionized water thereto. An equivalent weight of lithium ions with respect to 1 mole of sulfonic acid groups of Nafion® was 0.5. That is, 0.5 equivalents of sulfonic acid groups among the sulfonic acid groups of Nafion® were substituted with lithium ions.

Example 2

A composite anode active material was prepared in the same manner as in Example 1, except that the concentration of the lithium-substituted Nafion® solution used was 0.1 wt % instead of 0.3 wt %.

The amount of Nafion® coated in the composite anode active material was 0.005 wt % of a total weight of the composite anode active material.

Example 3

A composite anode active material was prepared in the same manner as in Example 1, except that the concentration of the lithium-substituted Nafion® solution used was 0.5 wt % instead of 0.3 wt %.

The amount of Nafion® coated in the composite anode active material was 0.02 wt % of a total weight of the composite anode active material.

Comparative Example 1

A mixture of a Si—Fe alloy (average particle diameter: about 3 µm, 3M, CV6, 3×66) and graphite (available from Shanshan, 3HE) in a weight ratio of 13:87 was used as an anode active material without coating with a lithium-substituted Nafion® solution.

Comparative Example 2

A composite anode active material was prepared in the same manner as in Example 1, except that the concentration of the lithium-substituted Nafion® solution used was 1.0 wt % instead of 0.3 wt %.

The amount of Nafion® coated in the composite anode active material was 0.05 wt % of a total weight of the composite anode active material.

Comparative Example 3

Graphite was used alone as an anode active material, without coating with a lithium-substituted Nafion® solution, instead of using the mixture of a Si—Fe alloy (average particle diameter: about 3 µm, 3M, CV6, 3×66) and graphite (available from Shanshan, 3HE) in a weight ratio of 13:87.

Comparative Example 4

A composite anode active material was prepared in the same manner as in Example 1, except that graphite was used alone instead of using the mixture of an Si—Fe alloy (average particle diameter: about 3 µm, 3M, CV6, 3×66) and graphite (available from Shanshan, 3HE) in a weight ratio of 13:87, and the concentration of the lithium-substituted Nafion® solution used was 1.0 wt % instead of 0.3 wt %.

The amount of Nafion® coated in the composite anode active material was 0.05 wt % of a total weight of the composite anode active material.

Comparative Example 5

A composite anode active material was prepared in the same manner as in Example 1, except that graphite was used alone instead of using the mixture of a Si—Fe alloy (average particle diameter: about 3 µm, 3M, CV6, 3×66) and graphite (available from Shanshan, 3HE) in a weight ratio of 13:87.

The amount of Nafion® coated in the composite anode active material was 0.01 wt % of a total weight of the composite anode active material.

(Manufacture of Anode and Lithium Battery)

Example 4

An anode active material slurry was prepared by adding deionized water to the powder-type composite anode active material prepared according to Example 1 and a mixture of a carbon conductive material (Denka Black), styrene-butadiene rubber (SBR), and carboxymethylcellulose (CMC) in a weight ratio of 97:1.5:1.5 as a conductive material, and mixing the resulting solution. The anode active material slurry was coated, to a thickness of about 110 µm, on copper foil having a thickness of 10 µm, and then the coated slurry was dried in an oven at 110° C. for 10 minutes to obtain an anode plate. The anode plate was pressed using a roll press to a thickness of 70 µm, followed by drying in a vacuum oven at 110° C. for 5 hours, thereby completing the manufacture of a coin cell (CR2032 type) having a diameter of 16 mm.

In the manufacture of the coin cell, metallic lithium was used as a counter electrode, a polyethylene separator having a thickness of 20 µm was used as a separator, and a mixed solution prepared by dissolving 1.15 M $LiPF_6$ in a mixed solvent of ethylene carbonate (EC), ethyl methyl carbonate (EMC), and diethyl carbonate (DEC) in a volume ratio of 3:3:4 (EC:EMC:DEC) was used as an electrolyte.

Examples 5 and 6

Lithium batteries were manufactured in the same manner as in Example 4, except that the powder-type composite anode active materials prepared according to Examples 2 and 3 were respectively used instead of using the composite anode active material of Example 1.

Comparative Examples 6 to 10

Lithium batteries were manufactured in the same manner as in Example 4, except that the powder-type composite anode active materials prepared according to Comparative Examples 1 to 5 were respectively used instead of using the composite anode active material of Example 1.

Evaluation Example 1: Evaluation of Charge and Discharge Characteristics

Each of the lithium batteries manufactured according to Examples 4 to 6 and Comparative Examples 6 to 10 was charged at a constant current of 0.1 C rate at 25° C. until the voltage reached 0.01 V (vs. Li). Subsequently, each lithium battery was discharged at a constant current of 0.1 C until the voltage reached 1.5 V (vs. Li).

Subsequently, each lithium battery was charged at a constant current of 0.2 C rate until the voltage reached 0.01 V (vs. Li). Then, each lithium battery was discharged at a constant current of 0.2 C until the voltage reached 1.5 V (vs. Li) (formation operation).

After the formation operation, each lithium battery was charged at a constant current of 0.7 C rate at 25° C. until the voltage reached 0.01 V (vs. Li). Subsequently, each lithium battery was discharged at a constant current of 1.0 C until the voltage reached 1.5 V (vs. Li). This cycle of charging and discharging was repeated 50 times.

Some of the charging and discharging experiment results are shown in Table 2 below. An initial charge/discharge efficiency is represented by Equation 1 below, and a capacity retention rate is represented by Equation 2 below:

Initial charge/discharge efficiency[%]=[discharge capacity at $1^{st}$ cycle/charge capacity at $1^{st}$ cycle]×100  Equation 1

Capacity retention rate[%]=[discharge capacity at $50^{th}$ cycle/discharge capacity at $1^{st}$ cycle]×100  Equation 2

TABLE 1

|  | Initial efficiency [%] | Capacity retention rate [%] |
|---|---|---|
| Example 4 (Si—Fe alloy + graphite + Nafion 0.3%) | 92.3 | 91.0 |
| Example 5 (Si—Fe alloy + graphite + Nafion 0.1%) | 91.7 | 90.1 |
| Example 6 (Si—Fe alloy + graphite + Nafion 0.5%) | 91.4 | 90.2 |
| Comparative Example 6 (Si—Fe alloy + graphite + Nafion 0.0%) | 91.5 | 85.7 |
| Comparative Example 7 (Si—Fe alloy + graphite + Nafion 1.0%) | 91.2 | 89.2 |
| Comparative Example 8 (Graphite alone + Nafion 0.0%) | 91.2 | 95.7 |
| Comparative Example 9 (Graphite alone + Nafion 1.0%) | 90.6 | 95.6 |
| Comparative Example 10 (Graphite alone + Nafion 0.3%) | 91.3 | 96.1 |

As shown in Table 1 above, the lithium batteries of Examples 4 to 6, which included the composite anode active materials including 0.005 wt % to 0.02 wt % of the ion-conductive polymers and the Si—Fe alloys, exhibited enhanced initial efficiencies and lifespan characteristics as compared to those of the lithium batteries of Comparative Examples 6 and 7.

In addition, the lithium batteries of Examples 4 to 6 exhibited enhanced initial efficiencies as compared to those of the lithium batteries of Comparative Examples 8 to 10 including graphite alone as a composite anode active material.

In addition, a ratio (CR1/CR2) of a capacity retention rate (CR1) of the lithium battery of Example 4, the battery including the alloy-based composite anode active material and coated with an ion-conductive polymer, to a capacity retention rate (CR2) of the lithium battery of Comparative Example 6 not coated with an ion-conductive polymer, was 1.062, which indicates a significant increase in capacity retention rate of 5% or greater. By contrast, a ratio (CR3/CR4) of a capacity retention rate (CR3) of the lithium battery of Comparative Example 10, the battery including the carbon-based anode active material alone and not coated with an ion-conductive polymer, to a capacity retention rate (CR4) of the lithium battery of Comparative Example 8 not coated with an ion-conductive polymer, was 1.004, which indicates an insignificant increase in capacity retention rate of 0.5%.

Thus, from the results shown above, it is confirmed that the lithium batteries including the alloy-based anode active materials exhibited a more significant enhancement of lifespan characteristics due to the coating with an ion-conductive polymer.

In particular, the lithium battery of Example 4 had a much higher capacity retention rate than that of each of the lithium batteries of Examples 5 and 6.

Evaluation Example 4: Measurement of Plate Expansion Rate

The lithium batteries having gone through the formation operation in Evaluation Example 1 above were disassembled and a thickness of each anode was measured, which was referred to as an anode thickness before a $1^{st}$ cycle of charging.

In addition, each lithium battery having gone through the formation operation in Evaluation Example 1 above was subjected to a $1^{st}$ cycle of charging at a constant current of 0.2 C rate at 25° C. until the voltage reached 0.01 V (vs. Li), and discharging at a constant current of 0.2 C until the voltage reached 1.5 V (vs. Li). Thereafter, each lithium battery was disassembled and the thickness of each anode was measured, and this was referred to as an anode thickness after a $1^{st}$ cycle of charging and discharging.

The plate expansion rate is represented by Equation 3 below:

Thickness expansion rate(%)=[thickness of anode after $1^{st}$ cycle of charging and discharging/thickness of anode before $1^{st}$ cycle of charging]×100  Equation 3

Plate expansion rates of the anode of each of the lithium batteries of Examples 4 to 6, the anode of each of the lithium batteries of Comparative Examples 6 and 7, and the anode of the lithium battery of Comparative Example 9 were measured, and measurement results thereof are shown in Table 2 below:

TABLE 2

|  | Thickness expansion rate [%] |
|---|---|
| Example 4 (Si—Fe alloy + graphite + Nafion 0.3%) | 30.0 |
| Example 5 (Si—Fe alloy + graphite + Nafion 0.1%) | 36.0 |
| Example 6 (Si—Fe alloy + graphite + Nafion 0.5%) | 32.0 |
| Comparative Example 6 (Si—Fe alloy + graphite + Nafion 0.0%) | 36.0 |
| Comparative Example 7 (Si—Fe alloy + graphite + Nafion 1.0%) | 32.0 |

As shown in Table 2 above, the plate expansion rates of the lithium batteries of Examples 4 to 6 were identical to or lower than those of the lithium batteries of Comparative Examples 6 and 7.

In particular, the lithium battery of Example 4 exhibited a much lower plate expansion rate than that of each of the lithium batteries of Comparative Examples 6 and 7.

Such a decrease in plate expansion rate is determined as being caused by the coating layer including an ion-conductive polymer effectively suppressing a change in volume of the core.

As apparent from the foregoing description, according to an embodiment, a composite anode active material including an ion-conductive polymer coated on a core including a metal alloyable with lithium is used, and thus a change in volume of an anode including the composite anode active material may be suppressed and a lithium battery including the anode may have enhanced initial efficiency and lifespan characteristics.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the drawing, it will be understood by those of ordinary skill in the art that various changes in form and details may be made therein without departing from the spirit and scope as defined by the following claims.

What is claimed is:

1. A composite anode active material powder comprising:
   a first core particle comprising a metal alloyable with lithium; and
   a coating layer on the first core particle,
   wherein the coating layer comprises an ion-conductive polymer,
   wherein an amount of the ion-conductive polymer is from about 0.0001 wt % to about 0.04 wt % based on a total weight of the composite anode active material powder, and
   wherein the ion-conductive polymer comprises at least one functional group selected from a carboxyl group, a carboxylate group, a cyano group, a phosphoric acid group, a sulfonic acid group, and a sulfonate group, and comprises lithium with which the functional group is substituted.

2. The composite anode active material powder of claim 1, wherein the ion-conductive polymer comprises a lithium substituted salt of at least one selected from poly(perfluorosulfonic acid), poly(perfluorocarboxylic acid), polystyrenesulfonic acid, polystyrenecarboxylic acid, sulfonated polyethersulfone, sulfonated polyetherketone, sulfonated polyetheretherketone, sulfonated polyarylethersulfone, sulfone sulfonated polysulfone, sulfonated polyimide, sulfonated polyphosphazene, sulfonated polybenzimidazole, sulfonated polyaryleneethersulfone, sulfonated polyphenylsulfide, sulfonated polyvinyl alcohol, and a sulfonic acid group-containing tetrafluoroethylene-fluorovinylether copolymer.

3. The composite anode active material powder of claim 1, wherein the ion-conductive polymer has a weight average molecular weight of about 10,000 Daltons to 1,000,000 Daltons.

4. The composite anode active material powder of claim 1, further comprising, in addition to the first core particle, a second core particle comprising a carbonaceous material, the second core particle having a coating layer comprising an ion-conductive polymer thereon.

5. The composite anode active material powder of claim 4, wherein an amount of the first core particle is about 30 wt % or less based on a total weight of the first and second core particles.

6. The composite anode active material powder of claim 1, wherein the first core particle comprises at least one metal selected from silicon (Si), tin (Sn), aluminum (Al), germanium (Ge), lead (Pb), zinc (Zn), silver (Ag), and gold (Au); an alloy, an oxide, a nitride, an oxynitride, or a carbide thereof; or a composite of one of these materials and a carbonaceous material.

7. The composite anode active material powder of claim 1, wherein the first core particle is a silicon-based alloy represented by Si—Fe or Si—Fe-$M_1$, wherein $M_1$ comprises at least one selected from lithium (Li), magnesium (Mg), calcium (Ca), titanium (Ti), vanadium (V), chrome (Cr), manganese (Mn), cobalt (Co), nickel (Ni), copper (Cu), zinc (Zn), yttrium (Y), zirconium (Zr), molybdenum (Mo), indium (In), tin (Sn), boron (B), carbon (C), oxygen (O), and phosphorus (P).

8. The composite anode active material powder of claim 4, wherein the coating layer is obtained by mixing, filtering, and drying 100 parts by weight of a polymer solution comprising an ion-conductive polymer in an amount of about 0.01 wt % to about 0.45 wt % based on 10 parts (total weight) by weight of the first and second core particles.

9. The composite anode active material powder of claim 4, wherein the first core particle comprises a silicon-iron alloy, the second core particle comprises graphite, and the coating layer is obtained by mixing, filtering, and drying 100 parts by weight of a polymer solution comprising Nafion in an amount of about 0.1 wt % to about 0.4 wt % based on 10 parts by weight (total weight) of the first and second core particles.

10. An anode comprising a mixture comprising the composite anode active material powder of claim 1 and a binder.

11. A lithium battery comprising the anode of claim 10.

* * * * *